Sept. 13, 1932.  S. JAMES  1,876,949

IMPROVEMENTS RELATING TO SUMMATION MEANS

Filed April 14, 1930   2 Sheets-Sheet 1

INVENTOR
S. James
By: Marks & Clerk
Attys.

Patented Sept. 13, 1932

1,876,949

UNITED STATES PATENT OFFICE

SAMUEL JAMES, OF BIRMINGHAM, ENGLAND, ASSIGNOR TO CHAMBERLAIN & HOOKHAM LIMITED, OF BIRMINGHAM, ENGLAND

IMPROVEMENTS RELATING TO SUMMATION MEANS

Application filed April 14, 1930, Serial No. 444,193, and in Great Britain May 2, 1929.

This invention relates to electricity and other meters of the kind in which a plurality of individual meters or measuring or recording devices are adapted to be connected in turn with a summation apparatus. The object of the present invention is to provide improved means for establishing the required intermittent connections between the said individual devices and the summation apparatus.

The invention comprises the combination of a rotary or other contact device actuated by the energy measuring meter or other mounting or recording apparatus, a pair of electromagnets, or an equivalent double acting magnet, controlled by the rotary or other contact device, and a lever or equivalent device whereby the said magnets or magnet can operate a trip lever either directly or through an electro-magnet for closing the circuit connected to the summation meter.

In the two accompanying sheets of explanatory drawings:—

In one manner of carrying the invention into effect, I employ a plurality of individual meters in different circuits for measuring the energy supplied to those circuits. After a given amount of energy has been supplied to the circuit it is required to effect an operation of a summation meter, which may be situated at some distance away, the function of the summation meter being to register or indicate the total indications of the individual meters.

Figure 1:
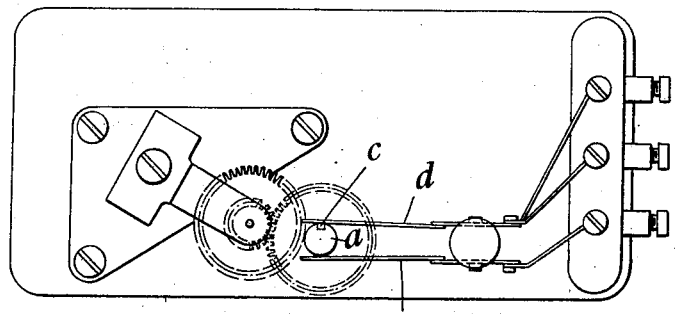
Figure 1 is a side elevation showing diagrammatically a mechanism containing a rotary contact device forming part of my invention.

In combination with each of the individual meters I provide a rotary contact device as shown in Figure 1 which comprises a cylinder $a$ of insulating material having a metallic ring $b$ at one end and a contact strip $c$ extending from the ring along the body of the cylinder. Associated with the cylinder are three fixed resilient contact fingers $d$. One of them bears against the ring and the other two bear against different portions of the cylinder. The cylinder is rotated by the meter in any convenient manner, the mechanism shown in Figure 1 being the usual counting mechanism of the meter. The rate of operation is such that after a predetermined quantity of energy has passed through the meter, the strip and ring close a circuit through one pair of contact fingers for a sufficient time to effect the operations to be hereinafter described. Later the strip and ring effect the closing of another circuit through another pair of contact fingers, and so on. Whilst it is convenient to employ two contact fingers making intermittent contact wth the strip above mentioned on the cylinder, it will be obvious that any desired number of such fingers may be employed at suitable distances apart around the cylinder. The rotary contact device formed by the cylinder and fingers controls a pair of electro-magnets $e$ situated on opposite sides of a lever $f$. In one position of the contact device one of the magnets is energized for the purpose of swinging the lever from one position to another. In another position of the contact device the other magnet is excited causing the lever to be returned. Instead of a pair of electro-magnets, a single double acting electro-magnet may be employed.

The lever $f$ is arranged in combination with a counter-balanced trip lever $g$ of bell crank form pivoted at $g'$, one end of the trip lever serving to support one end of a relatively heavy armature $h$ which can be acted upon by another electromagnet $i$ and is pivoted at $h'$. A stop $h^2$ is provided to limit the downward movement of the armature when it is released by the trip lever. The weight and arrangement of the arms of the trip lever $g$ on each side of its pivotal point $g'$ are such that the trip lever normally occupies a horizontal position resting on a stop $g^2$. In either movement of the lever $f$ the trip lever $g$ is momentarily operated in the direction for releasing the pivoted armature and immediately afterwards the trip lever returns to its original position where it can re-engage the armature after the latter has been restored to its original position by the magnet $i$. The raising of the lever $g$ by the lever $f$ is effected by the striking of the upper end of the lever $f$ against a roller $k$ on the lever $g$. The armature $h$ normally lies between the adjacent ends of pole pieces $l$ on the magnet $i$ so that the flux between the pole pieces passes across the armature. At one end the armature is provided with a light steel blade $m$ which can engage the projection $n$ on the lever $g$ for holding the armature in the position shown in Figure 3.

At the other end the armature engages a gap $o$ in an oscillatory disc $p$ which through the medium of a projection $q$ can depress a light spring contact strip $r$ into contact with a fixed contact piece $s$, the parts $r$ and $s$ being in the circuit of another electromagnet $t$ (Figure 5) belonging to the summation meter $t'$. The disc is held against accidental movement by the engagement of a light spring blade $u$ with a notch in the disc. Rocking of the disc $p$ is obtained by the movement of the armature $h$. When the left hand end of the armature falls the right hand end is raised causing the disc to be rocked in the direction for moving the part $r$ on to the contact $s$. The opposite movement of the armature causes the disc to be returned to the position shown. The blade $u$ exerts only sufficient control to prevent accidental movement of the disc.

In association with the summation meter there is arranged a number of contacts $v$ arranged about a common centre on which rotates a contact arm $w$. This arm is driven either intermittently or continuously at a regular speed by means of a motor $w'$, clock or other convenient mechanism, the function of the arm being to put each of the individual meter circuits in turn in connection with the summation meter. It will be understood that the speed of the arm $w$ in relation to the speeds of the cylinder $a$ will be so arranged as to prevent loss of registrations due to a maximum demand imposed on the cylinders.

Figure 2:
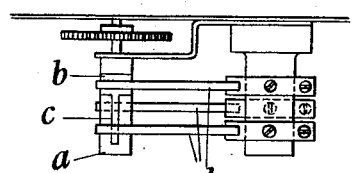
Figure 2 is a plan of the rotary contact.
Figure 3:
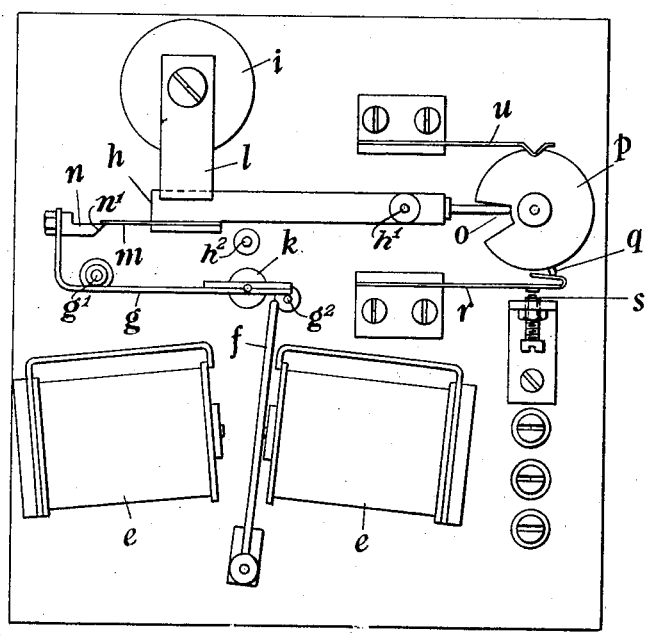
Figures 3 and 4 are respectively front and side elevations showing the electromagnetically operated portions of my mechanism.
Figure 4:
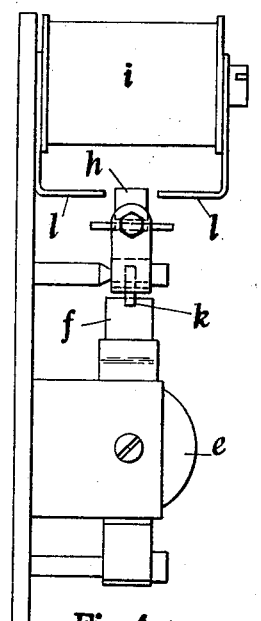

It will be understood that there is one such mechanism as is shown in Figures 2 and 3 in conjunction with each individual meter, and all the individual mechanisms can be connected in turn to the summation meter by the fixed and rotary contacts $v$, $w$, which are common to the whole system.

Figure 5:
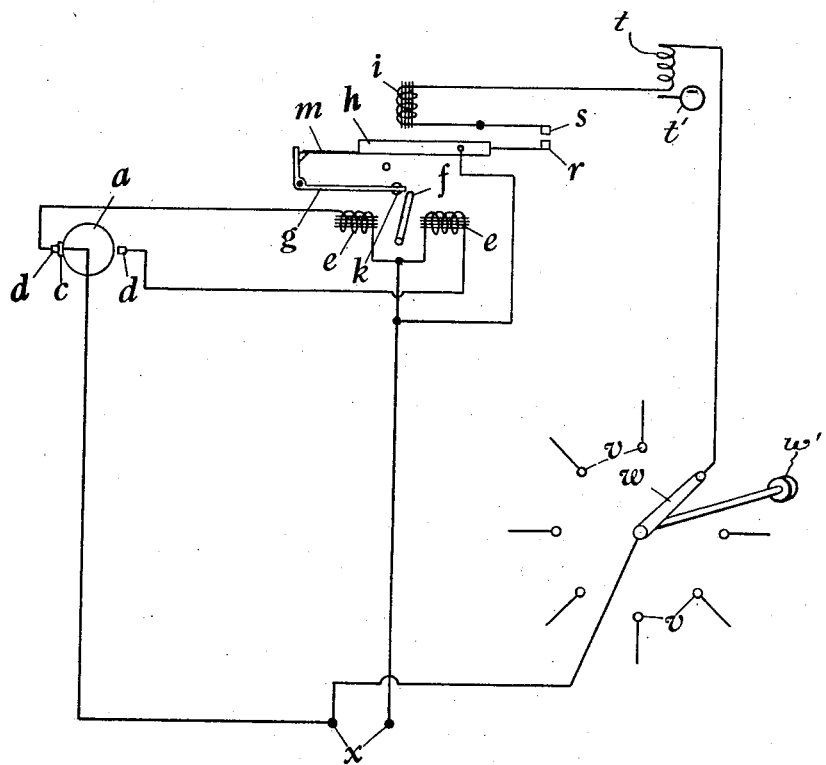
Figure 5 is a diagram illustrating the connections between the different parts of a system embodying my invention.

Considering the action of one only of the individual meters as shown in Figure 5 after a predetermined quantity of energy has passed through the meter and the rotary contact breaker, $a$, $b$, $c$, has moved through an appropriate angle, the first of the electromagnets $e$ is excited (for example the left hand magnet in Figure 5) and this causes the adjacent lever $f$ to be swung from one position to another. During this movement the lever raises the trip lever $g$ and releases the pivoted armature $h$, thereby causing the contacts $r$, $s$, controlled by the armature to come together and close the circuit through the magnet $t$ of the summation meter. If at that instant the rotary contact arm $w$ which is moved at a constant speed happens to be on the appropriate stud which completes the circuit, the summation meter magnet $t$ will cause a unit of movement to be given to the indicating or registering mechanism. But if the arm is not in the appropriate position, the circuit will remain in condition for the operation of the summation meter until the circuit is completed by the arm $w$. At the same time as the summation meter is actuated the electromagnet $i$ adjacent to the pivoted armature is also excited causing it to restore the armature to its original position and break the circuit containing the magnets $i$, $t$. To ensure the complete action of the device operated by the magnet $t$ before the circuit is opened, I adopt any convenient means. In the arrangement shown the armature $h$ is made relatively massive, and a certain amount of free movement of the armature is allowed before it actuates the contacts $r$, $s$. In order to enable the armature to re-assume its original position, the projection $n$ of the trip lever is formed with an inclined surface $n'$ which is engaged by the blade $m$ during the upward movement of the armature so that the trip lever is tilted and removed from the path of the armature. As soon as the blade $m$ has passed over this inclined surface the counter-balanced trip lever automatically re-assumes its normal horizontal position and holds the armature until the cycle of operations is repeated. It will be seen from Figure 3 of the drawings that when the electromagnet $i$ is de-energized, downward movement of the armature $h$ is prevented by the engagement of the blade $m$ on the armature with the projection $n$ on the trip lever. As this engagement occurs immediately above the pivotal point of the trip lever, the position of the latter will be unaffected by the weight of the armature. In the next operation of the same meter the lever is actuated by the other of the first two magnets $e$.

The rotary arm $w$ is moving continuously, either with an intermittent or regular motion, and in passing from one contact to another it puts each of the individual meters in turn in communication with the summation meter so that the latter may be actuated if the individual meter has already performed the operations necessary for actuating the summation meter. The latter is only actuated after a predetermined quantity of energy has passed any of the meters connected to the summation meter. Current is supplied to the apparatus above described at $x$.

By this invention I am able to obtain a much higher degree of accuracy and uniformity in the readings of the individual meters than has previously been possible, owing to the fact that the rotary contact device is constructed to impose a constant resistance to the action of the meter.

The invention is not limited to any particular subordinate details, as these may be varied to meet different requirements.

Further the invention is not limited to the summation of quantities of electrical energy, as it may be applied to other analogous uses. For example the rotary or like contact may be operated by any counting mechanism, and the apparatus may therefore be employed for totalizing a succession of mechanical operations or for other allied purposes.

Having thus described my invention what I claim as new and desire to secure by Letters Patent is:—

1. In summation means, the combination comprising a rotary contact device, a double acting magnet controlled by the said contact device, a movable member actuated by the magnet, a trip lever actuated by the movable member a circuit controlling device consisting in part of an element engageable by the trip lever, and an electromagnet for resetting the circuit controlling device, substantially as described.

2. In summation means, the combination comprising a measuring device, a rotary contact device actuated by the measuring device, a double acting electromagnet controlled by the rotary contact device, an oscillatory lever actuated by the magnet, a trip lever movable by the oscillatory lever, an armature engageable by the trip lever, an electromagnet adapted to reset the armature, a fixed contact, a movable contact controlled by the armature, a circuit containing the rotary contact device and the double acting magnet, a circuit containing the said fixed and movable contacts, the resetting electromagnet and an electromagnet of a summation apparatus, and a rotary arm for periodically making a connection in the second mentioned circuit, substantially as described.

3. In summation means, the combination comprising a rotary contact device, a pair of electromagnets controlled by the said contact device, an oscillatory lever situated between and actuated by the elecromagnets, a trip lever movable by the oscillatory lever, a pivoted and gravity operated armature engageable by the trip lever, an electromagnet for resetting the armature, an oscillatory member movable by the armature, a fixed contact, and a movable contact actuated by the said oscillatory member, substantially as described.

4. In electricity meters, means for effecting periodic operation of a summation meter by each of a plurality of electricity meters, comprising a rotary contact device driven by a meter, a pair of electromagnets which are alternately controlled by the contact device, an oscillatory lever mounted between the said magnets, a trip lever movable by the oscillatory lever, a pivoted and gravity operated armature which is held up by the trip lever, an electromagnet for resetting the armature, an oscillatory member movable by the armature, a fixed contact, a movable contact actuated by the oscillatory member, a circuit containing the fixed and movable contacts and the resetting magnet, an electromagnet forming part of the summation meter, a rotary arm, a contact engageable by the rotary arm, also contained in said circuit, each of a plurality of such circuits being successively rendered operative by the said arm, substantially as described.

In testimony whereof I have signed my name to this specification.

SAMUEL JAMES.